(12) United States Patent
Ottermann et al.

(10) Patent No.: US 10,730,792 B2
(45) Date of Patent: Aug. 4, 2020

(54) THIN GLASS ROLL AND METHOD FOR PRODUCING SAME

(71) Applicant: SCHOTT AG, Mainz (DE)

(72) Inventors: Clemens Ottermann, Hattersheim (DE); Rainer Liebald, Nauheim (DE); Andreas Habeck, Undenheim (DE); Kurt Nattermann, Ockenheim (DE); Markus Heiss-Chouquet, Bischofsheim (DE); Jürgen Vogt, Oberheimbach (DE); Thomas Wiegel, Alfeld (DE); Andreas Ortner, Gau-Algesheim (DE); Ning Da, Jiangxi (CN); Feng He, Jiangsu (CN); Pengxiang Qian, Shanghai (CN)

(73) Assignee: SCHOTT AG, Mainz (DE)

( * ) Notice: Subject to any disclaimer, the term of this patent is extended or adjusted under 35 U.S.C. 154(b) by 342 days.

(21) Appl. No.: 15/456,054

(22) Filed: Mar. 10, 2017

(65) Prior Publication Data
US 2017/0183258 A1 Jun. 29, 2017

Related U.S. Application Data

(63) Continuation of application No. PCT/EP2015/070804, filed on Sep. 11, 2015.

(30) Foreign Application Priority Data

Sep. 12, 2014 (DE) .................. 10 2014 113 149

(51) Int. Cl.
*C03C 21/00* (2006.01)
*B65H 18/28* (2006.01)
(Continued)

(52) U.S. Cl.
CPC ............ *C03C 21/002* (2013.01); *B65D 85/48* (2013.01); *B65D 85/676* (2013.01); *B65H 18/28* (2013.01); *B65H 2801/61* (2013.01)

(58) Field of Classification Search
None
See application file for complete search history.

(56) References Cited

U.S. PATENT DOCUMENTS 6,092,392 A * 7/2000 Verlinden .............. G03C 1/765 65/148
9,784,655 B2 * 10/2017 Heiss-Chouquet ...... G01N 3/08
(Continued)

FOREIGN PATENT DOCUMENTS

DE 102013110803 4/2015
EP 0875490 11/1998
(Continued)

OTHER PUBLICATIONS

"AF 32® eco Alkali-free alumina-borosilicate thin glass," downloaded from https://www.pgo-online.com/intl/af32.html. No author. (Year: 2019).*
(Continued)

*Primary Examiner* — David Sample
(74) *Attorney, Agent, or Firm* — Ohlandt, Greeley, Ruggiero & Perle, L.L.P.

(57) ABSTRACT

A glass ribbon in the form of a glass roll is provided that is optimized with respect to the requirements of a long service life and at the same time compact dimensions. A bending radius on the inner side of the thin glass roll is determined by performing breakage tests on samples of the glass material, statistical parameters are determined on the basis of the breakage tests, and the statistical parameters are converted
(Continued)

into a range of bending radii which meet the requirements on service life and the most compact dimensions possible of the thin glass roll.

18 Claims, 4 Drawing Sheets

(51) Int. Cl.
*B65D 85/676* (2006.01)
*B65D 85/48* (2006.01)

(56) References Cited

U.S. PATENT DOCUMENTS

| | | | | |
|---|---|---|---|---|
| 2011/0177290 A1* | 7/2011 | Tomamoto | ............ | B32B 17/064 428/142 |
| 2011/0177325 A1* | 7/2011 | Tomamoto | ............. | B65H 18/28 428/332 |
| 2011/0200812 A1 | 8/2011 | Tomamoto | | |
| 2012/0131955 A1* | 5/2012 | Kuroiwa | ............... | C03B 23/037 65/24 |
| 2012/0237779 A1* | 9/2012 | Teranishi | ............. | B65D 85/672 428/426 |
| 2014/0220300 A1 | 8/2014 | Ullmann | | |
| 2016/0207726 A1 | 7/2016 | Ortner | | |

FOREIGN PATENT DOCUMENTS

| | | |
|---|---|---|
| EP | 2336050 | 6/2011 |
| JP | 2010132349 | 6/2010 |
| TW | 201323307 | 6/2013 |
| WO | 2013050163 | 4/2013 |
| WO | 2015044430 | 4/2015 |
| WO | 2015057552 | 4/2015 |

OTHER PUBLICATIONS

English translation of International Search Report dated Jan. 18, 2016 for corresponding PCT/EP2015/070804, 3 pages.
English translation of International Preliminary Report on Patentability dated Sep. 7, 2016 for corresponding PCT/EP2015/070804, 19 pages.

* cited by examiner

THIN GLASS ROLL AND METHOD FOR PRODUCING SAME

CROSS REFERENCE TO RELATED APPLICATIONS

This application is a continuation of International Application No. PCT/EP2015/070804 filed on Sep. 11, 2015, which claims the benefit of German Application No. 10 2014 113 149.5 filed on Sep. 12, 2014, the entire contents of all of which are incorporated herein by reference.

BACKGROUND

1. Field of the Invention

The invention generally relates to the manufacturing of thin and ultrathin glasses. In particular, the invention relates to the preparation of long ribbon-shaped thin and ultrathin glass films in the form of a rolled glass ribbon.

2. Description of Related Art

Thin glass is increasingly employed for various applications, such as in the sectors of consumer electronics, for example as cover glasses for semiconductor modules, for organic LED light sources, or for thin or curved display devices, or in sectors of renewable energy or energy technology, such as in solar cells. Examples include touch panels, capacitors, thin film batteries, flexible circuit boards, flexible OLEDs, flexible photovoltaic modules, and even e-papers. Thin glass is getting more and more into the focus for many applications due to its excellent properties such as chemical resistance, thermal shock resistance, and heat resistance, gas tightness, its high electrical insulation capability, matched expansion coefficients, flexibility, high optical quality, and light transmission, as well as high surface quality with very low roughness in case of a fire-polished surface of the two thin glass faces. In the present context, thin glass refers to glass films with thicknesses smaller than 1.2 mm to thicknesses of 5 µm and smaller. Due to its flexibility, thin glass in the form of a glass film is increasingly rolled up after production and stored in the form of a glass roll or transported for being cut into final size or further processed. In a roll-to-roll process, the glass film can furthermore be rewound and provided for further utilization after an intermediate treatment, such as coating or surface finishing. Compared to storage and transport of material in the form of flat sheets, the rolling up of the glass involves the advantage of a more cost-effective compact storage, transport and handling during further processing.

In further processing, smaller glass film portions are separated from the glass roll or else from material stored or transported in the form of flat sheets, according to the requirements. In some applications, these glass film portions are again used as bent or rolled glass.

With all its excellent properties, glass as a brittle material has a rather low breaking strength since it is less resistant to tensile stress. When glass is bent, tensile stresses will occur at the outer surface of the bent glass. For storage without breakage and for transport without breakage of such a glass roll or for utilization of smaller glass film portions without cracks and fractures, the quality and integrity of the edges is first of all important in order to avoid the formation of a crack or fracture in the wound or bent glass film. Damages at the edges, such as tiny cracks, e.g. microscopic cracks, may alone be the reason and point of origin for larger cracks or fractures in the glass film. Furthermore, due to the tensile stress at the upper surface of the rolled or bent glass film, the surface has to be undamaged and free of scratches, grooves or other surface defects in order to avoid the formation of a crack or fracture in the wound or bent glass film. Thirdly, internal tensions in the glass resulting from the production process should also be as low as possible or not existent in order to avoid the formation of a crack or fracture in the wound or bent glass film. In particular the quality of the edge of the glass film is of special importance with regard to crack formation or crack propagation up to the breaking of the glass film.

According to the prior art, thin glasses or glass films are mechanically scored and broken by a specially cut diamond or a small wheel made of special steel or tungsten carbide. In this case, a stress is selectively generated in the glass by the scoring of the surface. Along the so produced fissure, the glass is broken in controlled manner by pressure, tension, or bending. As a result, edge faces with strong roughness, many microscopic cracks and chipping or spalling defects will usually be produced at the peripheral edges.

In order to increase edge strength, edges can then be seamed, chamfered, or ground and polished. However, in the case of glass films in particular in a thickness range of less than 200 µm, mechanical processing of the edges can no longer be realized without an additional risk of cracking and breaking of the glass. Depending on the quality of the glass and in particular of the glass edge, different bending strengths of the glass are resulting. It is precisely the quality of the edge that is decisive in this case. Therefore, two glass films similar in material and surface quality may have very different breakage probabilities upon bending of the glass edge when the edges are of different quality. If the produced thin glass film is intended to be provided in rolled-up form, there is therefore a great uncertainty concerning the possible diameter of the roll core or of the inner diameter of the glass roll. The innermost glass layer of the glass roll, forming the inner surface of the glass roll, has the smallest bending radius and therefore is subjected to the greatest bending stress. The further outside the respective glass layer is located, the greater the bending radius will be. However, a major portion of the glass ribbon will typically have bending radii similar to the inner radius of the glass roll. In order to minimize the risk of breakage and/or to maximize the service life of the glass ribbon, it is, of course, always possible to choose a large roll core diameter. However, this has the disadvantage that very bulky dimensions are obtained in this way. For both the further processing of glass rolls and its storage, particularly compact dimensions, that means in particular small inner diameters, would of course be desirable. At the same time, however, the lowest possible breakage rate of the glass ribbon within a predetermined storage period should be provided.

SUMMARY

Therefore, an object of the invention is to provide a glass ribbon in the form of a glass roll that is optimized with respect to the aforementioned requirements of a long service life and at the same time compact dimensions. This object is achieved by the invention, which is based on the discovery that in order to determine the bending radius on the inner side of the glass roll, which meets the above mentioned requirements, breaking tests of samples of the glass material can be performed, statistical parameters can be determined on the basis of the breaking tests, and the statistical parameters can be converted, preferably by scaling using an exponential term containing the service life, into a range of bending radii which meet the requirements on service life and the most compact dimensions possible of the glass roll.

BRIEF DESCRIPTION OF THE DRAWINGS

The invention will now be explained in more detail, with further reference to the enclosed drawings, wherein.

DETAILED DESCRIPTION

Figure 1:
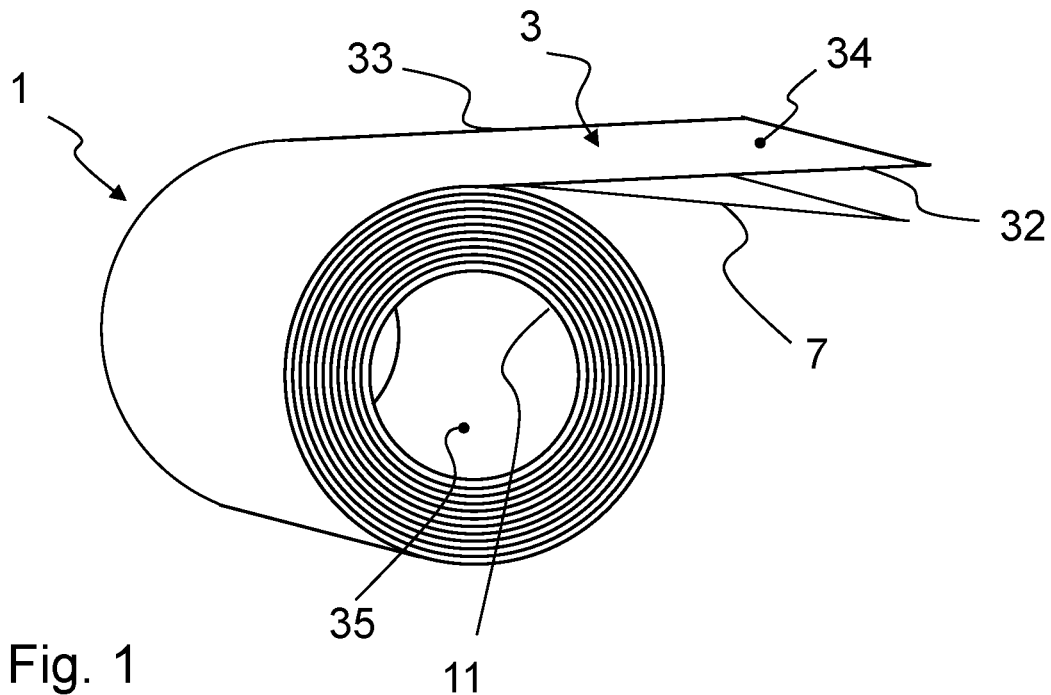
FIG. 1 shows a thin glass roll comprising a wound thin glass ribbon.

FIG. 1 shows a thin glass roll 1 which is obtained by rolling up a thin glass ribbon 3 that has opposite faces 34, 35. The two edges 32, 33 or more precisely the longitudinal edges of the thin glass ribbon 3 form the end faces of roll 1 or at least part of the end faces. Optionally, the roll 1 may be wound around a mandrel, so that the inner surface of the roll 1 rests on the outer surface of the mandrel.

The thin glass ribbon 3 in this form may later be unwound from roll 1 for subsequent processing steps. This form of packaging of thin glass is particularly suitable for automated production processes such as laminating onto electronic components or the production of displays.

In case of an automated production process it is important that the entire wound thin glass ribbon 3 has no fracture and that the thin glass ribbon 3 is not severed upon automated unwinding. However, the thin glass is bent when being wound. Bending is accompanied by a tensile stress, to which one of the sides of the thin glass 3 is subjected. The tensile stress is the greater the smaller the bending radius. The wound thin glass ribbon 3 will have the smallest bending radius on the inner surface 11 of the roll 1, wherein the minimum bending radius R is related to the tensile stress σ as shown below:

$$\sigma = \frac{E}{1-v^2}\frac{d}{2R}.$$

In this expression, E represents the Young's modulus, d is the thickness of the thin glass, and v is the Poisson's ratio of the glass.

Now, some time may pass between the further processing of the thin glass when being wound into a roll 1 and the unwinding thereof in a further manufacturing process. Typically, the roll 1 will be stored for some time after having been completed. Also, transportation thereof takes time. It has been found that adverse fractures of the glass may even occur with a time delay after winding, as a result of the unilateral tensile stress generated during bending, despite of the small glass thickness.

The invention now makes it possible to wind thin glass ribbons 3 into thin glass rolls 1 which in terms of their inner radius are dimensioned such that with a high probability they will withstand a predetermined period, for example, an average or maximum storage period.

Now, as shown by way of example in FIG. 1, the invention provides a thin glass roll 1 comprising a wound thin glass ribbon 3 having a length of at least 10 meters and a thickness of at most 200 micrometers, wherein the inner radius of the wound thin glass ribbon 3 is in a range from $$R_{min} = \langle R \rangle \cdot \left\{ \left[ 0.7 + \exp\left(\frac{s}{\langle R \rangle \cdot 0.053} - 2.3\right) \right] \cdot (2 - e^{-t}) \right\} \text{ to}$$

$$R_{max} = \langle R \rangle \cdot \left\{ \left[ 3.4 + \exp\left(\frac{s}{\langle R \rangle \cdot 0.05} - 2.1\right) \right] \cdot (2 - e^{-t}) \right\}$$

wherein <R> is a mean value and $$s = \sqrt{\frac{1}{N-1}\sum R_i^2 - \langle R \rangle^2}$$

is a variance of the bending radii $R_i$ at break of a plurality N of samples made of the same glass material having the same thickness and the same glass edge quality as the glass material of the thin glass ribbon, wherein $R_i$ are the bending radii at which the respective samples break, and t is a minimum time period, in days, the thin glass roll withstands without break. Such time-delayed fractures are caused in particular by stress corrosion cracking.

A corresponding method for producing a thin glass roll 1 comprising a wound thin glass ribbon 3 having a length of at least 10 meters and a thickness of at most 200 micrometers accordingly comprises: determining, in a breaking test, a mean value <R> of the bending radii $R_i$ at break of a plurality N of samples 10 under progressively increasing bending stress, and a variance s according to equation (1); and providing a thin glass ribbon 3 made of the same glass material having the same thickness and the same glass edge quality as the glass material of the samples 10 and winding it into a thin glass roll 1, wherein the inner radius of the thin glass roll 1, which is the radius of the innermost layer of the thin glass ribbon 3 in the thin glass roll 1 is chosen so that it is in a range between $R_{min}$ according to equation (2) and $R_{max}$ according to equation (3), wherein t is a predetermined minimum time period, in days, the thin glass roll is intended to withstand without break. However, a certain fracture probability will usually exist, even in case of very large bending radii of the glass ribbons. However, the parameters of equations (2) and (3) are adjusted so that the breakage rate will generally be less than 0.1, preferably less than 0.05 within a predetermined minimum time period.

In order to protect the glass surfaces, a web material 7 may be wound together with the glass ribbon, as shown in the example of FIG. 1. This web material then separates consecutive glass layers in the glass roll or is arranged between the individual glass layers or turns of the thin glass ribbon 3. Preferably, paper or synthetic material is used as the web material 7. Optionally, the web material may protrude beyond the edges 32, 33 of the thin glass ribbon 3.

The thin glass samples may be obtained from a further thin glass ribbon which is similar in terms of glass material, thickness and edge quality. It is likewise possible to separate the samples from the thin glass ribbon 3, for example at one of the ends thereof.

The thickness d of the thin glass ribbon 3 is preferably at most 200 μm, more preferably at most 100 μm. It is furthermore generally preferred that the glass thickness is at least 5 μm.

Figure 2:
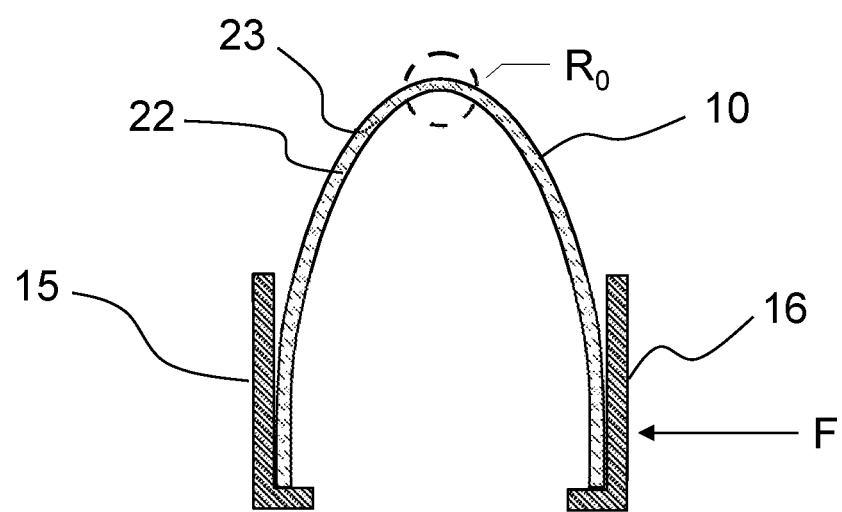
FIG. 2 shows a setup for determining the mean value of the bending radius and its variance at break of thin glass samples under bending stress.

FIG. 2 shows a setup for determining the mean value of the bending radius <R> and its variance sat break of thin glass samples under bending stress.

In order to obtain sufficiently trustworthy statistics for reliably determining the bending radius in the range defined by equations (2) and (3), according to a further embodiment at least twenty, preferably at least 50 samples of the thin glass are subjected to a bending stress and hence a tensile stress until break, in order to determine the mean value <R> of bending radii $R_i$ and the variance thereof.

The procedure performed with the setup according to FIG. 2 is based on a bending test for determining the parameters <R> and s, in which a thin glass sample 10 is uniaxially bent until break. In the setup shown in FIG. 2, the thin glass sample 10 is clamped between two jaws 15, 16. Jaws 15, 16 are moved toward each other, so that the thin glass sample 10 is bent more and more. The bending is effected in only one direction. The minimum radius of curvature Ro is in the middle between the two jaws. If, for example, the jaws are arranged at a slight angle to each other, the edge at which the jaws 15, 16 are closer to each other will be stressed more than the opposite edge. Accordingly, the minimum radius of curvature will be at this edge. It is also possible to evenly load both edges 22, 23.

The jaws are now brought together until the sample 10 breaks. The minimum bending radius $R_0$ at this moment is recorded. The mean value <R> can then be calculated from a plurality of such recorded radii, and the variance s can be calculated from the spread of the measured values.

At least one of the edges 22, 23 of sample 10 is formed by a section of one of the longitudinal edges 34, 35 of the thin glass ribbon 3. This is advantageous in order to be able to evaluate the edge strength by the bending test. The strength of the edges is usually significantly lower than the strength of the glass surfaces. Therefore, fractures will be emanating from an edge in most cases.

The samples 10 will typically have a smaller width than the thin glass ribbon 3 the samples 10 are separated from. In this case, only one of the two edges 22, 23 is a segment of a longitudinal edge 34, 35 of the thin glass ribbon 3. In this case, the jaws 15, 16 may be arranged at a slight angle to each other so that the sample 10 is bent more strongly on the edge defined by the longitudinal edge of the thin glass ribbon 3 when the jaws are brought together.

Figure 3:
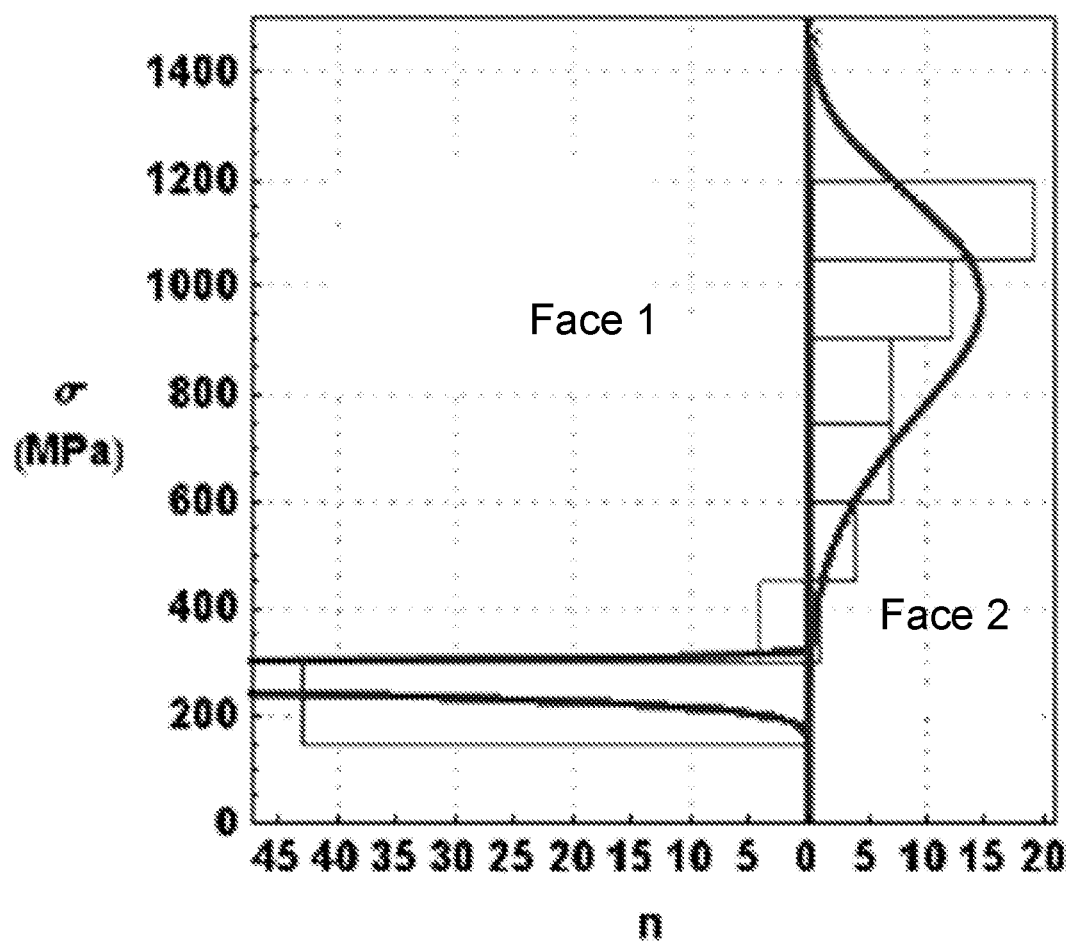
FIG. 3 shows histograms of tensile stress at break of thin glass samples under bending stress.

FIG. 3 shows histograms of the bending stress at break of thin glass samples 10. The breaking tests were performed twice, in a first test the samples 10 were bent around one of the faces and in the second test the samples were bent around the opposite face. Accordingly, two histograms are shown in FIG. 3, which are designated "face 1" and "face 2", respectively. The bars represent the number of samples 10 which broke in the respective ranges of tensile stress σ.

It can clearly be seen that the histograms differ. The histogram designated "face 1" shows a smaller distribution of breaking stresses than the histogram designated "face 2" which, by contrast, has a lower mean value of the breaking stress. Such differences may result from the manner in which the glass edges are produced. In the example of FIG. 3, the glass edges were produced by scoring using a Penett wheel and subsequent breaking. In this case, face 1 is the scored face of the glass. For the histogram "face 1", the scored face was subjected to tensile stress in the breaking test. Thus, in the arrangement shown in FIG. 2, this face would be the convexly curved face. As a result of scoring, additional damages are caused at the corner of the edge toward the face, thereby reducing the average breaking strength, which explains the difference between histograms "face 1" and "face 2".

Using the example of the histogram designated "face 1", a range for the inner radius of a thin glass ribbon 3 made from a similar glass can now be determined according to the invention. The mean value <σ> of tensile stress at break of the samples is about 230 MPa according to the histogram. The variance is about 20 MPa.

The thin glass is a non-alkaline borosilicate glass having a thickness of 50 micrometers and a factor $E/(1-v^2)=79.3*10^3$ MPa. Consequently, according to equation (1) a value of 7.74 millimeters is obtained for the mean bending radius <R>, and a value of 0.41 millimeters for the variance.

Assuming a storage period t of 5 days that should at least be survived without break, values $R_{min}=14.98$ mm and $R_{max}=57.86$ mm are obtained according to equations (2) and (3). Accordingly, an inner diameter between 30 mm and 116 mm is now selected for the glass roll 1 that is to be rolled up from a thin glass ribbon made of similar glass, and the ribbon is wound so that the face corresponding to face 1 of the samples 10 will be curved convexly.

A comparison to the values obtained from histogram "face 2" is very surprising. The bending strength of samples 10 convexly bent around face 2 is significantly higher. Therefore, it would have to be expected that the glass roll in which the thin glass ribbon 3 is wound correspondingly so that face 2 is convexly curved is significantly more robust. When evaluating the histogram "face 2", a mean value <R> of 2.35 millimeters and a variance of 0.612 millimeters is obtained. Assuming again a storage period of 5 days, values of $R_{min}=70.9$ mm, $R_{max}=127.3$ mm are obtained according to equations (2), (3). Accordingly, the inner diameter of the glass roll would have to be between 142 millimeters and 254 millimeters. Thus, although significantly higher strengths and smaller bending radii until break are achieved on average when the glass is bent around face 2, the glass can be wound more tightly when bent in the opposite direction, with the same or better service life and probability of breakage. The reason for this is the low variance in the case of bending around face 1. Although in this case the edge line actually damaged by the scoring wheel is subjected to tensile stress, these damages obviously cause very uniform defect types and defect distributions in this case.

Thus, the invention generally permits to wind the glass in such a manner that higher short- and long-term stability of the glass ribbon is achieved even in case of different qualities of the faces and in particular of the edge lines. In particular the parameter $R_{min}$ according to equation (2) is relevant for this purpose.

Based on an evaluation of the minimum radius $R_{min}$ it is thus possible to provide a glass roll 1 comprising a wound thin glass ribbon 3, wherein the thin glass ribbon 3 has two opposite faces 34, 35 and longitudinal edges 32, 33, wherein the thin glass ribbon 3 is wound so that the convexly curved face is that face 34, 35 for which samples 10 cut out of the thin glass ribbon 3 along the longitudinal edges 32, 33 and bent around the longitudinal edges 32, 33 in the same direction as the thin glass ribbon 3, i.e. also exhibit a convex curvature of this face, have a smaller value of $R_{min}$ according to equation (2) compared to samples 10 bent in the opposite direction. Since the term including the exponential factor $2-e^{-t}$ scales the respective values for $R_{min}$ in equal manner, this term can be omitted for the comparison in this case. Therefore, according to a further embodiment of the invention, it is also possible to use $$R_{min} = \langle R \rangle \cdot \left[ 0.7 + \exp\left( \frac{s}{\langle R \rangle \cdot 0.053} - 2.3 \right) \right] \quad (5)$$

as a parameter for determining the winding sense, instead of equation (2).

Since, as mentioned above, the breaking strength and the service life of a thin glass ribbon may depend on the direction of bending, it is contemplated according to a further embodiment of the invention that a first set of samples 10 is bent in one bending direction and a second set of samples 10 is bent in the opposite bending direction and that the parameters $R_{min}$ and $R_{max}$ are determined separately for the two sets of samples 10.

Then, the bending direction of the thin glass ribbon 3 for producing the thin glass roll 1 can be chosen so that it corresponds to the bending direction of the set of samples 10 for which the smaller value of $R_{min}$ was determined.

It will be apparent to those skilled in the art that the invention is not limited to the illustrated examples but can be varied in many ways within the scope of the claims. For example, as shown in FIG. 2 a breaking test for determining $R_{min}$ and $R_{max}$ was performed in the form of a two-point bending test. The measured values shown in FIG. 3 are also based on such a two-point bending test. However, alternative breaking tests may as well be used to determine radii $R_i$ at break or to calculate such radii.

In any case, the preparation of the thin glass roll comprises the rolling up, optionally together with the described intermediate layers. However, further processing steps may be added. In particular, the providing of the thin glass ribbon 3 may comprise drawing from a melt or from a heated preform.

In the case of thin glass ribbons made of alkaline glass, according to one embodiment of the invention a process of chemical toughening by ion exchange of the thin glass ribbon, referred to as glass ribbon below, may be integrated into the method of the invention, whereby the strength of the glass ribbon can be increased.

Chemical toughening is achieved by ion exchange. The process of chemical toughening, also referred to as chemical tempering, comprises at least the following method steps a) to c): preheating the glass ribbon to a temperature in a range from 300 to 550° C.; chemically toughening the glass ribbon by ion exchange in surface regions at a toughening temperature $T_H$ in a range from 350 to 550° C.; cooling the glass ribbon (3) to a temperature of <150° C.

After the process of chemical toughening the glass ribbon is rolled up using the inventive method.

According to one embodiment of the toughening process, the glass ribbon preferably has a thickness in a range from 30 to 144 µm. The glass ribbon is chemically toughened by an ion exchange during which in particular sodium and/or lithium ions in near-surface regions of the glass ribbon are at least partially replaced by potassium ions. To this end, potassium ions are applied to the opposite faces 34, 35 of the glass ribbon prior to step a) and/or in step b).

First, in step a), the glass ribbon is heated to a temperature in a range from 300 to 550° C. whereby the thin glass is preheated to the temperature at which chemical toughening takes place in step b). The preheating to the toughening temperature prevents stresses from arising in the thin glass due to an excessively large temperature difference during the chemical toughening or due to a too rapid heating of the glass and therefore prevents the thin glass from breaking during the toughening. Preheating may be performed in a continuous furnace, for example. This variant is especially appropriate when the glass ribbon is already provided in the form of a glass roll and is unwound to be subsequently rewound into a glass roll using the inventive method. Thus, the toughening process can be integrated in a roll-to-roll process.

In another variant the glass ribbon is already at a temperature of about the toughening temperature $T_H$ prior to step a), for example because of a drawing process upstream of the process. In this case, active heating of the glass ribbon in step a) may therefore be dispensed with.

Once the thin glass ribbon has been preheated to the toughening temperature in step a), the thin glass is chemically toughened by ion exchange in near-surface regions of the glass ribbon in step b). Here, an ion exchange takes place in which lithium and/or sodium ions in the near-surface regions of the glass are partially replaced by potassium ions which previously have been applied to the opposite faces of the glass ribbon.

In the subsequent step c) the toughened glass ribbon is cooled to a temperature of less than 150° C. Method steps a) to c) are preferably performed in continuous furnaces.

According to one embodiment of the toughening process, the glass ribbon is heated in step a) in a continuous furnace having a temperature gradient. In this way, the glass ribbon is heated very gently and so stresses in the glass ribbon are avoided. The employed furnace preferably has a temperature gradient which increases from one end of the furnace toward the other end. Thus, at one end the furnace has a lower temperature $T_u$ and at the other end it has a higher temperature $T_o$, with $T_u < T_o$. The temperature of the furnace rises along the advancement direction of the glass ribbon, i.e. the glass ribbon enters the furnace at the end of the furnace having the temperature $T_u$. A temperature gradient between a lower temperature $T_u < 150°$ C. and a higher temperature $T_o$ in the range from 350 to 500° C. has been found particularly advantageous with regard to the reduction of stresses in the glass ribbon and to processing times. Preferably, the higher temperature $T_o$ corresponds to the toughening temperature $T_H$.

In step b), the glass ribbon is chemically toughened by at least partially replacing sodium and/or lithium ions by potassium ions in near-surface regions of the glass ribbon. In this case, the potassium ions are applied to the opposite faces of the glass ribbon prior to the toughening process. The desired penetration depth of layer (DOL) of the potassium ions and the degree of increase in strength Cs can be adjusted through the process parameters toughening temperature $T_H$ and toughening time $t_H$. The toughening time $t_H$, that is the dwell time in the toughening furnace, may be adjusted through the feeding rate of the glass ribbon and the length of the toughening furnace or the length of the transport path traversed by the glass ribbon in the toughening furnace. Suitable materials for the roller in the toughening furnace are in particular glass, ceramics, metal, or composites of these materials.

After toughening in step b), the toughened glass ribbon is cooled in step c). In order to avoid stresses in the toughened glass it is advantageous to use a furnace having a temperature gradient. The furnace is preferably configured as a continuous furnace and has a higher temperature $T_o$ at one end and a lower temperature $T_u$ at the other end. The toughened glass ribbon is passed through the furnace by entering the furnace at the end of the furnace having the higher temperature $T_o$, being cooled within the furnace, and leaving the furnace at a temperature $T_u$. A lower temperature $T_u$ of <150° C. has been found advantageous. The higher temperature $T_o$ of the furnace is preferably from 350 to 550° C. In particular a higher temperature $T_o$ corresponding to the toughening temperature $T_H$ in the preceding step b) has been found particularly advantageous. The temperature of the furnace rises along the advancement direction of the glass ribbon, i.e. the glass ribbon enters the furnace at the end of the furnace having the temperature $T_u$. A temperature gradient between a lower temperature $T_u$<150° C. and a higher temperature $T_o$ in the range from 350 to 500° C. has been found particularly advantageous with regard to the reduction of stresses in the glass ribbon and to processing times. Preferably, the higher temperature $T_o$ corresponds to the toughening temperature $T_H$.

In step b), the glass ribbon is chemically toughened by at least partially replacing sodium and/or lithium ions by potassium ions in near-surface regions of the glass ribbon. In this case, the potassium ions are applied to the surface of the glass ribbon, i.e. to the opposite faces thereof, prior to the toughening process. The desired penetration depth of layer (DOL) of the potassium ions and the amount of compressive stress Cs can be adjusted through the process parameters toughening temperature $T_H$ and toughening time $t_H$. The toughening time $t_H$, that is the dwell time in the toughening furnace, may be adjusted through the feeding rate of the glass ribbon and the length of the toughening furnace or the length of the transport path traversed by the glass ribbon in the toughening furnace. Suitable materials for the roller in the toughening furnace are in particular glass, ceramics, metal, or composites of these materials.

After toughening in step b), the toughened glass ribbon is cooled in step c). In order to avoid stresses in the toughened glass it is advantageous to use a furnace having a temperature gradient. The furnace is preferably configured as a continuous furnace and has a higher temperature $T_o$ at one end and a lower temperature $T_u$ at the other end. The toughened glass ribbon is passed through the furnace by entering the furnace at the end of the furnace having the higher temperature $T_o$, being cooled within the furnace, and leaving the furnace at a temperature $T_u$. A lower temperature $T_u$ of <150° C. has been found advantageous. The higher temperature $T_o$ of the furnace is preferably from 350 to 550° C. In particular a higher temperature $T_o$ corresponding to the toughening temperature $T_H$ in the preceding step b) has been found particularly advantageous.

One embodiment of the toughening process contemplates to use the same continuous furnace with a temperature gradient in step a) and in step c). Since in this case only one furnace is needed, this permits to make the apparatus more compact and to save energy.

The toughening process during the transportation according to the invention may be performed after the drawing process before winding into a glass roll. The drawn glass ribbon is cleaned, dried, and toughened. Since the glass is drawn at high temperatures and thus has a correspondingly high temperature prior to the toughening process, the preheating duration may be reduced or this process step may even be omitted entirely. This is especially applicable if after the drawing process the glass ribbon has a temperature of about the toughening temperature $T_H$.

According to a variant, the potassium ions may be applied to the surface of the glass ribbon by passing the glass ribbon through a potassium-containing melt, in step b). The melt may contain $KNO_3$, for example.

Alternatively, or in addition, a potassium-containing salt solution may be applied to the upper and lower surface of the glass ribbon, i.e. the upper and lower face of the glass ribbon. In this case, application of the potassium ions is accomplished before the glass ribbon is passed through the toughening furnace. Preferably, the potassium-containing salt solution is applied to the opposite faces of the glass ribbon prior to the preheating of the glass ribbon (step a)). Besides the preheating of the glass ribbon, the solvent is evaporated in step a) in this case.

The potassium-containing salt solution may be applied onto the surface of the glass ribbon by spraying, for example. Preferably, the potassium-containing salt solution is an aqueous solution of salts $KNO_3$, $K_3PO_4$, KCl, KOH, and/or $K_2CO_3$.

In this manner, a glass roll including an alkali-containing chemically toughened thin glass with a thickness of less than 200 μm can be obtained. It is even possible to obtain glass rolls of chemically toughened thin glass having a glass thickness in a range from only 30 to 145 μm.

The glass ribbon is in particular enriched with potassium ions in regions near the surface thereof. In one embodiment, the penetration depth of layer (DOL) is up to 30 μm. Preferably, the glasses of the glass roll have a penetration depth of layer DOL of about 2 to 8 μm, more preferably of about 3 to 5 μm.

Glasses with such DOLs have a sufficiently high strength to be employed as cover glass for touch-sensitive displays in portable electronic devices, for example. At the same time, only short toughening durations are required for such relatively low exchange depths, which is advantageous in terms of processing. For example, toughening time $t_H$ may be reduced to a duration of less than one hour or even less than 30 minutes. Even toughening times $t_H$ of only 10 to 20 minutes are possible in this way.

In the case where the toughening process is integrated in the transportation process of the glass ribbon, a shortest possible toughening time $t_H$ is of higher relevance than with the conventional method in which the glass remains stationary in a salt melt during the ion exchange. In the integrated toughening process, long toughening durations $t_H$ would slow down the entire winding process and require very low advancement rates and/or a long transport path.

Alternatively or additionally, some processing of the edges is possible, which may in particular be performed to improve edge strength. With an improvement of edge strength, the range specified by the parameters $R_{min}$, $R_{max}$ will then usually be shifted to smaller values.

As has been explained by way of the example of FIG. 3, successful processing of the edges may not only include to increase the mean breaking strength. Rather, the variance is also decisive for how tightly a thin glass ribbon 3 can be rolled up without increasing the risk of breakage.

In this case not only the variance as an absolute value is crucial, but in particular the relative variance $s/\langle R \rangle$, included in the exponent of equations (2), (3). According to yet another embodiment of the invention it is therefore contemplated that the longitudinal edges 34, 35 of the thin glass ribbon 3 are processed in a manner so as to decrease the relative variance or the ratio of the variance s to the mean value $\langle R \rangle$ at break of samples 10 having the same bending direction as the thin glass ribbon 3 in the glass roll 1. This relative variance therefore in particular relates to break at edges 22, 23 defined by segments of the longitudinal edges 34, 35 of the thin glass ribbon 3.

Accordingly, more broadly stated, thin glass ribbons 3 which exhibit a relative variance at break of samples 10 of the thin glass ribbon 3 of less than 0.15 are preferred for a glass roll 1 of the invention. For comparison, the relative variance s/<R> of the bending radii of the histogram designated "face 1" is 0.05279. By contrast, for the histogram designated "face 2" the relative variance of the bending radii is 0.2633. Exactly this results in a higher risk of breakage of the thin glass ribbon when being rolled up tightly, despite the high average strength. As can be seen from this example, surprisingly, edge processing may even lower the average strength and nevertheless allow for tighter winding of the thin glass, if variance is reduced at the same time.

FIGS. 4 to 7 schematically illustrate method steps of the toughening process. The illustrated toughening process may be integrated into the method of the invention.

Figure 4:
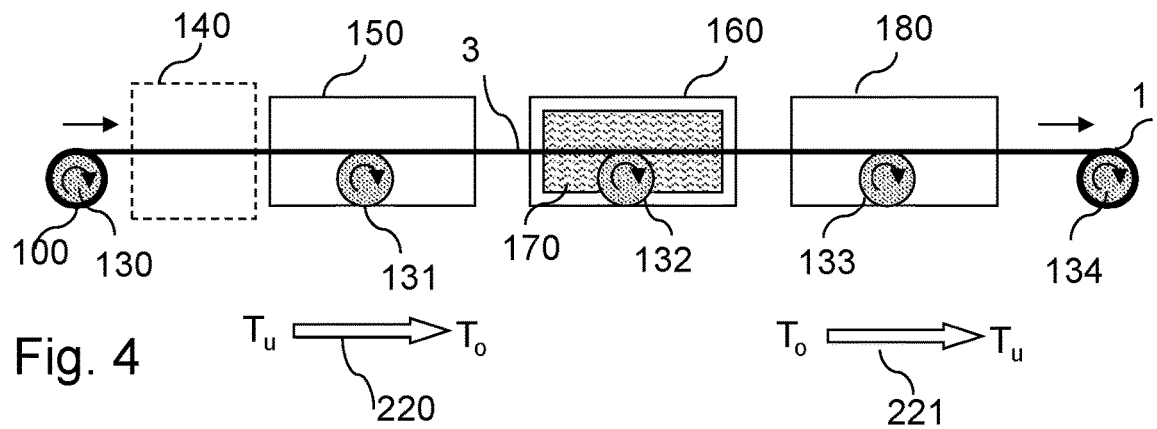
FIG. 4 schematically illustrates a process for toughening the thin glass ribbon 3, which may be integrated into the method according to the invention.

In the toughening process schematically illustrated in FIG. 4, the thin glass has a thickness in a range from 30 to 144 μm. Here, the arrows indicate the advancement direction of the glass ribbon 3 conveyed by rollers 130, 131, 132, 133, 134. In this example, the glass ribbon 3 is unwound from a glass roll 100, chemically toughened and wound into the glass roll 1 using the inventive method.

The unwound glass ribbon 3 is first cleaned and dried. This process step is schematically represented by rectangle 140. Subsequently, the glass ribbon 3 is passed through a furnace 150. In continuous furnace 150, glass ribbon 3 is heated to a temperature in the range from 300 to 550° C. and leaves the continuous furnace 150 at a temperature of about the toughening temperature $T_H$. This avoids stresses induced in the glass ribbon by a temperature difference in subsequent step b). It has been found particularly advantageous to heat glass ribbon 3 in a continuous furnace 150 having a temperature gradient. The temperature gradient in furnace 150 is schematically represented by arrow 220. The temperature gradient in the furnace is defined by lower temperature $T_u$ and higher temperature $T_o$ in the furnace. The opening of furnace 150 through which the glass ribbon 3 enters the furnace is at temperature $T_u$ in this case. Within the furnace, the temperature rises up to temperature $T_o$ so that when leaving the furnace the glass ribbon 3 has a temperature $T_o$ or close to $T_o$. Preferably, temperature $T_u$ is in a range from 20 to 150° C., and/or the higher temperature $T_o$ is in a range from 350 to 550° C. By heating the glass ribbon 3 using a corresponding temperature gradient, stresses are prevented from arising in the glass. It has been found particularly advantageous to heat the glass ribbon to a temperature that corresponds to the toughening temperature $T_H$ in step b).

The glass ribbon 3 preheated in step a) is passed through toughening furnace 160 in step b). The toughening furnace has a toughening temperature $T_H$ within a range from 300 to 550° C. Toughening temperature $T_H$, i.e. the temperature at which the ion exchange takes place, depends on the particular glass composition of the glass ribbon and on the exchange depth of layer (DOL) that is to be obtained, and on the desired compressive stress Cs.

Toughening furnace 160 includes a molten salt bath 170 through which the glass ribbon 3 is pulled. Molten salt bath 170 contains potassium ions, so that an ion exchange takes place in the regions near the surface of the glass ribbon, during which sodium and/or lithium ions are replaced by potassium ions.

In this embodiment, roller 132 in toughening furnace 160 is entirely or partially immersed in molten salt bath 170, so that the material of roller 132 should be inert or at least substantially inert with respect to the molten salt bath. Suitable materials for roller 132 have been found to include glass, metals, and ceramics. Composite materials made of glass, metal and/or ceramics may be used as well.

The advancement rate of the glass ribbon 3 is adjusted so that the glass ribbon remains in the molten glass for the required toughening time $t_H$. Toughening time $t_H$ depends on the toughening temperature $T_H$ and on the exchange depth of layer DOL to be achieved. For example, penetration depths of about 3 to 5 μm may already be achieved with toughening durations between 10 and 20 minutes.

After the toughening process, the toughened glass ribbon is cooled in step c) in a further continuous furnace 180. Continuous furnace 180 provides for slow cooling of the glass ribbon 3 so that stresses in the glass are avoided. In the illustrated embodiment, furnace 180 also has a temperature gradient which is represented by arrow 221. At the opening through which the glass ribbon 3 enters furnace 180, furnace 180 has a temperature $T_o$. Along the advancement direction of glass ribbon 3 the temperature in furnace 180 decreases, so that at the opening through which the glass ribbon 3 leaves the furnace, the furnace has a temperature $T_u$, with $T_o > T_u$. Preferably, temperature $T_o$ is about the toughening temperature $T_H$. Cooling to temperatures of less than 150° C. has been found particularly advantageous.

Figure 5:
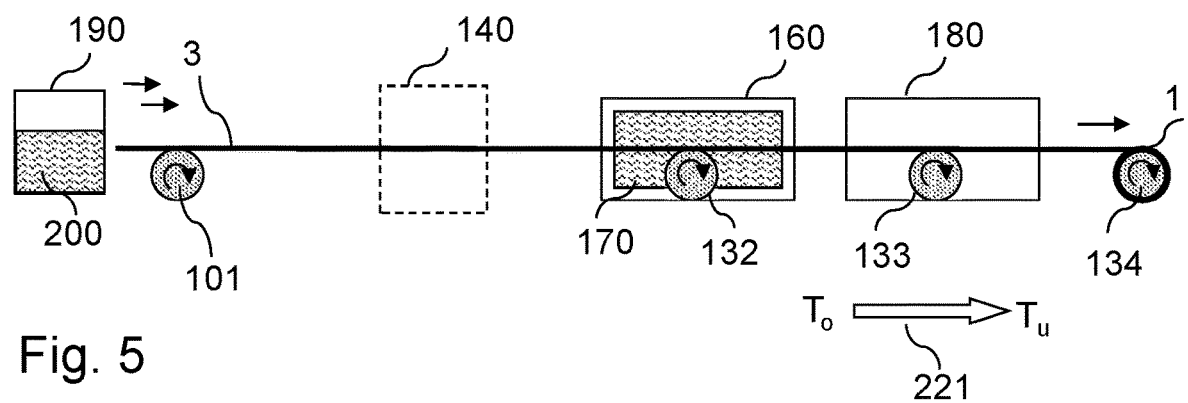
FIG. 5 schematically illustrates a further embodiment of the toughening process.

FIG. 5 shows a variant of the toughening process according to which the toughening process is performed following the drawing process (not shown) for producing a thin glass ribbon 3. Since after the drawing process the glass ribbon 3 has a temperature of about the toughening temperature $T_H$ or even higher, preheating of the glass ribbon 3 in step a) can be omitted in the embodiment variant shown in FIG. 5. Therefore, this variant is particularly advantageous from an energetic point of view.

Glass ribbon 101 is merely cleaned and dried and is then subjected to method steps b) and c) similar to the variant of the toughening process shown in FIG. 4.

Figure 6:
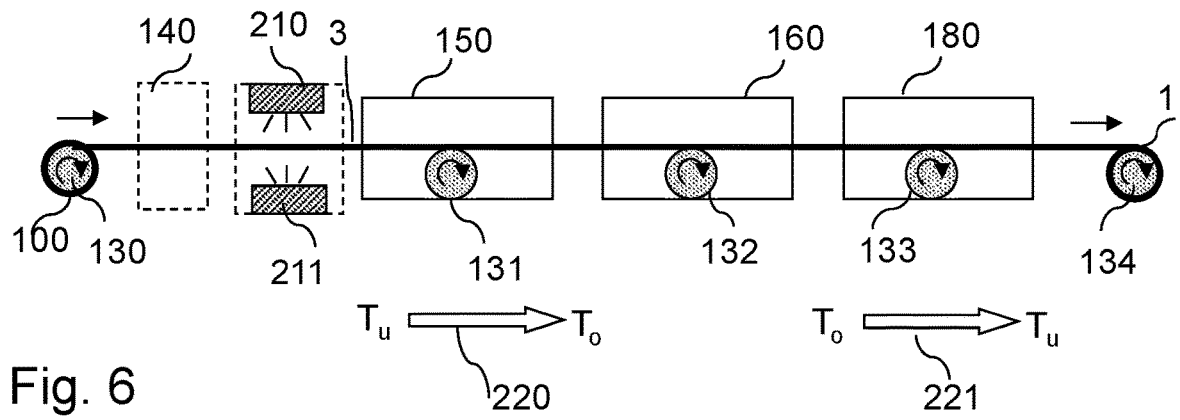
FIG. 6 schematically illustrates a further embodiment of the toughening process in which the potassium ions are applied to the thin glass ribbon 3 in the form of an aqueous solution.

The potassium ions needed for ion exchange may as well be applied to the opposite faces of the glass ribbon 3 in the form of a solution. This is schematically illustrated in FIG. 6. First, glass ribbon 3 is cleaned and dried. In a subsequent step, glass ribbon 3 runs through a device 210 in which a potassium salt solution 211 is applied to the upper and lower surfaces of glass ribbon 3. This solution preferable is an aqueous solution. In the illustrated embodiment, solution 211 is sprayed onto the surfaces of the glass ribbon. Subsequently, in step a), the so treated glass ribbon 3 passes through furnace 150 in which it is heated to a temperature of about the toughening temperature $T_H$ whereby the solvent evaporates. Subsequently, the glass ribbon 3 passes through toughening furnace 160 which has a temperature $T_H$ in the range from 300 to 550° C. In this step b) the ion exchange takes place during which sodium and/or lithium ions in regions near the surface of the glass ribbon are replaced by potassium ions previously applied to the glass surface. The selected dwell time $t_H$ depends on the desired exchange depth of layer DOL.

Figure 7:
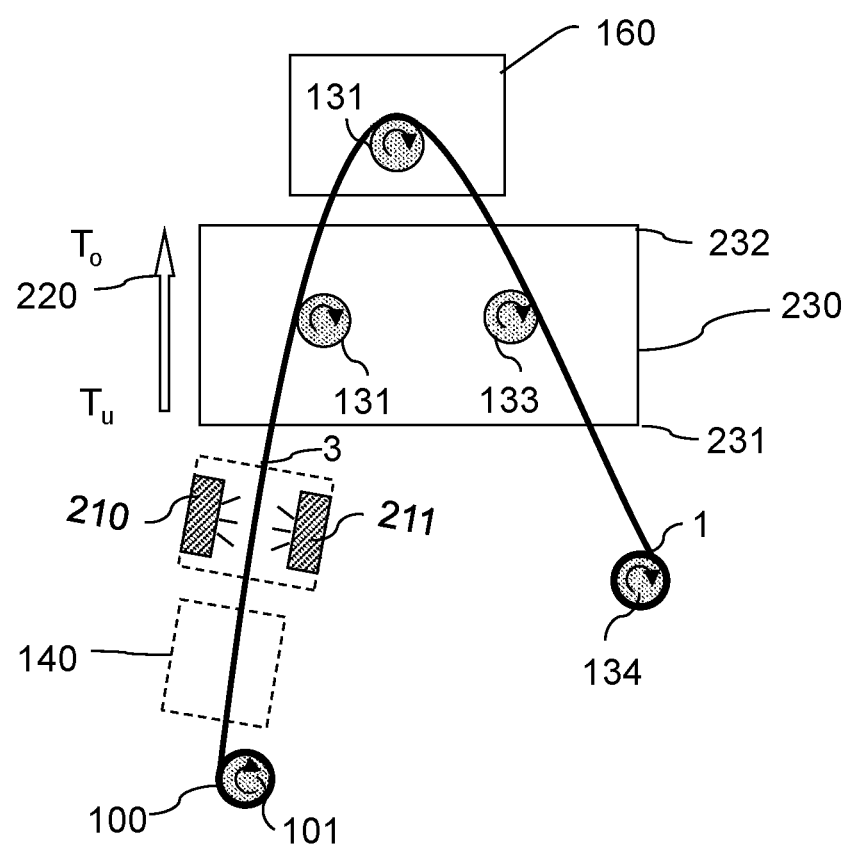
FIG. 7 schematically illustrates a toughening process in which the method steps a) and c) are carried out in the same furnace.

FIG. 7 illustrates another variant of the method according to the invention, in which the glass ribbon 3 is passed through the same continuous furnace 230 with temperature gradient in steps a) and c). Furnace 230 has a temperature gradient illustrated by arrow 220, with a lower temperature $T_u$ and a higher temperature $T_o$. Glass ribbon 3 enters and leaves the furnace 230 through two opposite openings 231 and 232, respectively. At opening 231, the furnace has a lower temperature $T_u$, and at opening 232 a higher temperature $T_o$, with $T_o > T_u$.

According to this variant, in step a) the glass ribbon 3 is advanced into furnace 230 through opening 231. While glass ribbon 110 passes through furnace 230 in step a) it is heated, and it leaves furnace 230 through opening 232 at temperature $T_o$. In the subsequent step b), the ion exchange takes place in furnace 160. According to this embodiment variant of the invention, toughening furnace 161 only has one opening. In this variant of the invention, the toughening roller 131 is provided in form of a deflection roller so that glass ribbon 3 will undergo a change in the advancement direction by the toughening roller. After the glass ribbon 3 has been heated to the toughening temperature $T_H$ for the toughening time $t_H$ within furnace 160, the glass ribbon 110 leaves furnace 160 through the opening 161. For cooling the so toughened glass ribbon 3 the latter is pulled through opening 232 into furnace 230 in step c). Here, due to the temperature gradient of the furnace, the glass ribbon slowly cools down to the lower temperature $T_u$ before leaving furnace 230 through opening 231 and can be wound into glass roll 1.

The invention claimed is:

1. A thin glass roll, comprising:
a thin glass ribbon having a length of at least 10 meters and a thickness of at most 200 micrometers, the thin glass ribbon being wound with an inner radius in a range from:

$$R_{min} = \langle R \rangle \cdot \left\{ \left[ 0.7 + \exp\left(\frac{s}{\langle R \rangle \cdot 0.053} - 2.3\right) \right] \cdot (2 - e^{-t}) \right\} \text{ to}$$

$$R_{max} = \langle R \rangle \cdot \left\{ \left[ 3.4 + \exp\left(\frac{s}{\langle R \rangle \cdot 0.05} - 2.1\right) \right] \cdot (2 - e^{-t}) \right\}$$

wherein $\langle R \rangle$ is a mean value and $$s = \sqrt{\frac{1}{N-1} \Sigma R_i^2 - \langle R \rangle^2}$$

is a variance of a bending radii at break of a plurality N of samples made of the same glass material having the same thickness and the same glass edge quality as the glass material of the thin glass ribbon, wherein $R_i$ are the bending radii at which the respective samples break, t is a minimum time period, in days, the thin glass roll withstands without break, and wherein at least twenty samples of the thin glass are subjected to a bending stress until break, in order to determine the mean value $\langle R \rangle$ of the bending radii $R_i$ and the variance thereof, wherein the minimum time (t) is 5 days, and
wherein the thin glass ribbon has two opposite faces and two opposite longitudinal edges,
wherein the thin glass ribbon is wound so that a convexly curved face is that face for which samples cut out of the thin glass ribbon along the longitudinal edges and bent around the longitudinal edges in a common direction as the thin glass ribbon exhibits a smaller value of $R_{min}$ compared to samples bent in an opposite direction.

2. The thin glass roll as claimed in claim 1, wherein the thin glass ribbon is a non-alkali borosilicate glass having a thickness of 50 micrometers, and wherein the thin glass roll comprises a core having a diameter between 30 millimeters and 83 millimeters.

3. The thin glass roll as claimed in claim 1, further comprising a web material wound together with the thin glass ribbon so as to separate consecutive glass layers.

4. The thin glass roll as claimed in claim 1, further comprising a relative variance, given by a ratio $s/\langle R \rangle$ at break of samples of the thin glass ribbon, that is less than 0.15.

5. The thin glass roll as claimed in claim 1, wherein the thin glass ribbon comprises a chemically toughened alkali glass.

6. The thin glass roll as claimed in claim 5, wherein the thin glass ribbon has an exchange depth of layer in a range from 1 to 10 micrometers.

7. The thin glass roll as claimed in claim 5, wherein the thin glass ribbon has an exchange depth of layer in a range from 3 to 5 micrometers.

8. The thin glass roll as claimed in claim 1, wherein the thickness is at most 100 micrometers and at least 5 micrometers.

9. The thin glass roll as claimed in claim 1, wherein the thickness is less than 145 micrometers.

10. A thin glass roll, comprising:
a thin glass ribbon having a length of at least 10 meters and a thickness of at most 200 micrometers, the thin glass ribbon being wound with an inner radius in a range from:

$$R_{min} = \langle R \rangle \cdot \left\{ \left[ 0.7 + \exp\left(\frac{s}{\langle R \rangle \cdot 0.053} - 2.3\right) \right] \cdot (2 - e^{-t}) \right\} \text{ to}$$

$$R_{max} = \langle R \rangle \cdot \left\{ \left[ 3.4 + \exp\left(\frac{s}{\langle R \rangle \cdot 0.05} - 2.1\right) \right] \cdot (2 - e^{-t}) \right\}$$

wherein $\langle R \rangle$ is a mean value and $$s = \sqrt{\frac{1}{N-1} \Sigma R_i^2 - \langle R \rangle^2}$$

is a variance of a bending radii at break of a plurality N of samples made of the same glass material having the same thickness and the same glass edge quality as the glass material of the thin glass ribbon, wherein $R_i$ are the bending radii at which the respective samples break, t is a minimum time period, in days, the thin glass roll withstands without break, and wherein at least twenty samples of the thin glass are subjected to a bending stress until break, in order to determine the mean value $\langle R \rangle$ of the bending radii $R_i$ and the variance thereof,
wherein the thin glass ribbon has two opposite faces and two opposite longitudinal edges, wherein the thin glass ribbon is wound so that a convexly curved face is that face for which samples cut out of the thin glass ribbon along the longitudinal edges and bent around the longitudinal edges in a common direction as the thin glass ribbon exhibits a smaller value of $$R_{min} = \langle R \rangle \cdot \left[ 0.7 + \exp\left(\frac{s}{\langle R \rangle \cdot 0.053} - 2.3\right) \right]$$

compared to samples bent in an opposite direction, wherein $\langle R \rangle$ is the mean value and $$s = \sqrt{\frac{1}{N-1} \Sigma R_i^2 - \langle R \rangle^2}$$

is the variance of the bending radii at break of the samples, wherein $R_i$ are the bending radii at which the respective samples break, and wherein at least twenty samples of the thin glass are subjected to a bending stress until break, in order to determine the mean value <R> of the bending radii $R_i$ and the variance thereof.

11. The thin glass roll as claimed in claim 10, wherein the thin glass ribbon is a non-alkali borosilicate glass having a thickness of 50 micrometers, and wherein the thin glass roll comprises a core having a diameter between 30 millimeters and 83 millimeters.

12. The thin glass roll as claimed in claim 10, further comprising a web material wound together with the thin glass ribbon so as to separate consecutive glass layers.

13. The thin glass roll as claimed in claim 10, further comprising a relative variance, given by a ratio s/<R> at break of samples of the thin glass ribbon, that is less than 0.15.

14. The thin glass roll as claimed in claim 10, wherein the thin glass ribbon comprises a chemically toughened alkali glass.

15. The thin glass roll as claimed in claim 14, wherein the thin glass ribbon has an exchange depth of layer in a range from 1 to 10 micrometers.

16. The thin glass roll as claimed in claim 14, wherein the thin glass ribbon has an exchange depth of layer in a range from 3 to 5 micrometers.

17. The thin glass roll as claimed in claim 10, wherein the thickness is at most 100 micrometers and at least 5 micrometers.

18. The thin glass roll as claimed in claim 10, wherein the thickness is less than 145 micrometers.

* * * * *